United States Patent [19]
Stetson et al.

[11] Patent Number: 6,099,811
[45] Date of Patent: Aug. 8, 2000

[54] SELF-HEATING METAL-HYDRIDE HYDROGEN STORAGE SYSTEM

[75] Inventors: Ned T. Stetson, Auburn Hills; Krishna Sapru, Troy; Heidi Van Kirk, Dearborn, all of Mich.

[73] Assignee: Energy Conversion Devices, Inc., Troy, Mich.

[21] Appl. No.: 09/023,295

[22] Filed: Feb. 13, 1998

[51] Int. Cl.[7] .................................................. B01J 8/02
[52] U.S. Cl. ..................... 422/212; 422/198; 422/129; 48/61; 423/658.2
[58] Field of Search .................................... 422/202, 211, 422/212, 239, 204, 129, 198; 95/55, 56; 423/658.2; 165/104.12; 48/61, 197 R

[56] References Cited

U.S. PATENT DOCUMENTS

| | | | |
|---|---|---|---|
| 4,165,569 | 8/1979 | Mackay | 34/416 |
| 4,290,267 | 9/1981 | Buchner | 60/648 |
| 4,614,176 | 9/1986 | Kesten | 126/110 R |
| 4,741,156 | 5/1988 | Buchner | 60/303 |
| 5,158,759 | 10/1992 | Marinexcu-Pasoi et al. | 423/658.2 |
| 5,888,273 | 3/1999 | Buxbaum | 95/56 |

*Primary Examiner*—Marian C. Knode
*Assistant Examiner*—Susan Ohorodnik
*Attorney, Agent, or Firm*—Philip H. Schlazer; Marvin S. Siskind; David W. Schumaker

[57] ABSTRACT

A self-heating metal-hydride hydrogen storage system comprising: a primary metal-hydride storage container housing a metal-hydride hydrogen storage material, the primary storage container having a hydrogen outlet port; a hydrogen combustor housed within the primary metal-hydride storage container and surrounded by the high-temperature storage material, the combustor having a hydrogen inlet port gaseously connected to the hydrogen outlet port of the primary storage container; and means for supplying hydrogen gaseously connected to the hydrogen inlet port of the combustor.

8 Claims, 1 Drawing Sheet

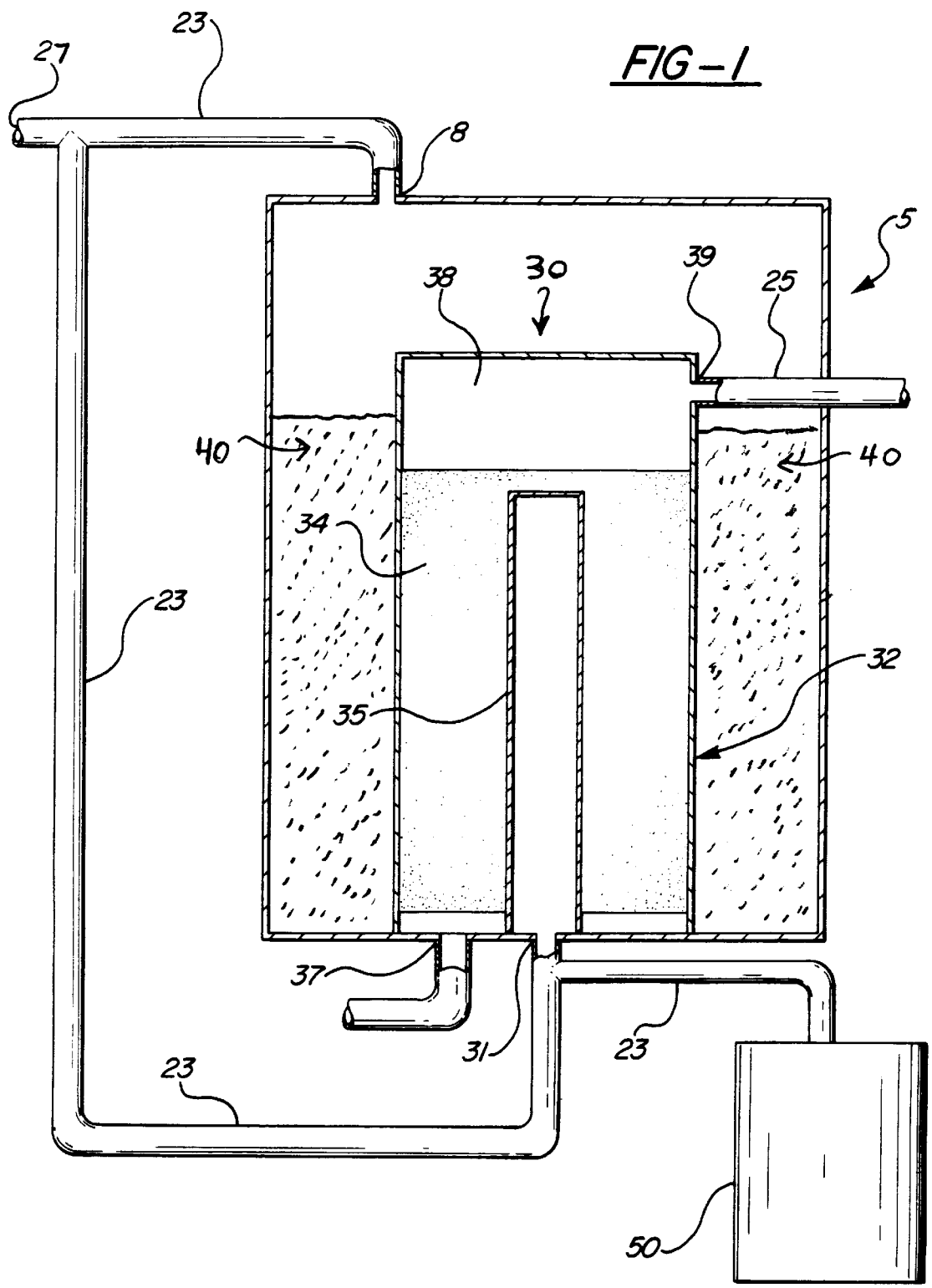

SELF-HEATING METAL-HYDRIDE HYDROGEN STORAGE SYSTEM

FIELD OF THE INVENTION

The present invention deals with metal-hydride hydrogen storage system. More specifically the present invention deals with a self-heating metal-hydride hydrogen storage system.

BACKGROUND OF THE INVENTION

Growing energy needs have prompted specialists to take cognizance of the fact that the traditional energy resources, such as coal, petroleum or natural gas, are not inexhaustible, or at least that they are becoming costlier all the time, and that it is advisable to consider replacing them gradually with other energy sources, such as nuclear energy, solar energy, or geothermal energy. Hydrogen, too, is coming into use as an energy source.

Hydrogen may be used, for example, as fuel for internal-combustion engines in place of hydrocarbons. In this case it has the advantage of eliminating atmospheric pollution through the formation of oxides of carbon or of sulfur upon combustion of the hydrocarbons. Hydrogen may also be used to fuel hydrogen-air fuel cells for production of the electricity needed for electric motors.

One of the problems posed by the use of hydrogen is its storage and transportation. A number of solutions have been proposed. Hydrogen may be stored under high pressure in steel cylinders, but this approach has the drawback of requiring hazardous and heavy containers which are difficult to handle (in addition to having a low storage capacity of about 1% by weight). Hydrogen may also be stored in cryogenic containers, but this entails the disadvantages associated with the use of cryogenic liquids; such as, for example, the high cost of the containers, which also require careful handling. There are also "boil off" losses of about 2–5% per day.

Another method of storing hydrogen is to store it in the form of a hydride, which then is decomposed at the proper time to furnish hydrogen. The hydrides of iron-titanium, lanthanum-nickel, vanadium, and magnesium have been used in this manner, as described in French Pat. No. 1,529, 371.

The $MgH_2$—Mg system is the most appropriate of all known metal-hydride and metal systems that can be used as reversible hydrogen-storage systems because it has the highest percentage by weight (7.65% by weight) of theoretical capacity for hydrogen storage and hence the highest theoretical energy density (2332 Wh/kg; Reilly & Sandrock, Spektrum der Wissenschaft, Apr. 1980, 53) per unit of storage material.

Although this property and the relatively low price of magnesium make the $MgH_2$—Mg seem the optimum hydrogen storage system for transportation, for hydrogen-powered vehicles that is, its unsatisfactory kinetics have prevented it from being used up to the present time. It is known for instance that pure magnesium can be hydrided only under drastic conditions, and then only very slowly and incompletely. The dehydriding rate of the resulting hydride is also unacceptable for a hydrogen storage material (Genossar & Rudman, Z. f. Phys. Chem., Neue Folge 116, 215 [1979], and the literature cited therein).

Moreover, the hydrogen storage capacity of a magnesium reserve diminishes during the decomposition-reconstitution cycles. This phenomenon may be explained by a progressive poisoning of the surface, which during the reconstitution renders the magnesium atoms located in the interior of the reserve inaccessible to the hydrogen.

To expel the hydrogen in conventional magnesium or magnesium/nickel reserve systems, temperatures of more than 250° C. are required, with a large supply of energy at the same time. The high temperature level and the high energy requirement for expelling the hydrogen have the effect that, for example, a motor vehicle with an internal combustion engine, cannot exclusively be operated from these stores. This occurs because the energy contained in the exhaust gas, in the most favorable case (full load), is sufficient for meeting 50% of the hydrogen requirement of the internal combustion engine from a magnesium or magnesium/nickel store. Thus, the remaining hydrogen demand must be taken from a hydride store. For example, this store can be titanium/iron hydride (a typical low-temperature hydride store) which can be operated at temperatures down to below 0° C. These low-temperature hydride stores have the disadvantage of only having a low hydrogen storage capacity.

Storage materials have been developed in the past, which have a relatively high storage capacity but from which hydrogen is nevertheless expelled at temperatures of up to about 250° C. U.S. Pat. No. 4,160,014 describes a hydrogen storage material of the formula $Ti_{[1-x]}Zr_{[x]}Mn_{[2-y-z]}Cr_{[y]}V_{[z]}$, wherein x=0.05 to 0.4, y=0 to 1 and z=0 to 0.4. Up to about 2% by weight of hydrogen can be stored in such an alloy. In addition to this relatively low storage capacity, these alloys also have the disadvantage that the price of the alloy is very high when metallic vanadium is used.

Moreover, U.S. Pat. No. 4,111,689 has disclosed a storage alloy which comprises 31 to 46% by weight of titanium, 5 to 33% by weight of vanadium and 36 to 53% by weight of iron and/or manganese. Although alloys of this type have a greater storage capacity for hydrogen than the alloy according to U.S. Pat. No. 4,160,014, hereby incorporated by reference, they have the disadvantage that temperatures of at least 250° C. are necessary in order to completely expel the hydrogen. At temperatures of up to about 100° C., about 80% of the hydrogen content can be discharged in the best case. However, a high discharge capacity, particularly at low temperatures, is frequently necessary in industry because the heat required for liberating the hydrogen from the hydride stores is often available only at a low temperature level.

In contrast to other metals or metal alloys, especially such metal alloys which contain titanium or lanthanum, magnesium is preferred for the storage of hydrogen not only because of its lower material costs, but above all, because of its lower specific weight as a storage material. However, the hydriding

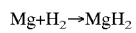

is, in general, more difficult to achieve with magnesium, inasmuch as the surface of the magnesium will rapidly oxidize in air so as to form stable MgO and/or $Mg(OH)_2$ surface layers. These layers inhibit the dissociation of hydrogen molecules, as well as the absorption of produced hydrogen atoms and their diffusion from the surface of the granulate particles into the magnesium storage mass.

Intensive efforts have been devoted in recent years to improve the hydriding ability of magnesium by doping or alloying it with such individual foreign metals as aluminum (Douglass, Metall. Trans. 6a, 2179 [1975]) indium (Mintz, Gavra, & Hadari, J. Inorg. Nucl. Chem. 40, 765 [1978]), or iron (Welter & Rudman, Scripta Metallurgica 16, 285

[1982]), with various foreign metals (German Offenlegungsschriften 2 846 672 and 2 846 673), or with intermetallic compounds like $Mg_2Ni$ or $Mg_2Cu$ (Wiswall, Top Appl. Phys. 29, 201 [1978] and Genossar & Rudman, op. cit.) and LaNi5 (Tanguy et al., Mater. Res. Bull. 11, 1441 [1976]).

Although these attempts did improve the kinetics somewhat, certain essential disadvantages have not yet been eliminated from the resulting systems. The preliminary hydriding of magnesium doped with a foreign metal or intermetallic compound still demands drastic reaction conditions, and the system kinetics will be satisfactory and the reversible hydrogen content high only after many cycles of hydriding and dehydriding. Considerable percentages of foreign metal or of expensive intermetallic compound are also necessary to improve kinetic properties. Furthermore, the storage capacity of such systems are generally far below what would theoretically be expected for $MgH_2$.

Traditional ambient temperature metal hydrides suffer from low gravimetric hydrogen storage densities of normally less than 2 weight percent. Potential storage alloys which have gravimetric storage densities of greater than 3 weight percent tend to require high temperatures (>200° C.) for desorption. Magnesium-based alloys are considered to be very promising for storage alloys due to their high potential gravimetric storage densities and the low cost of Mg. However these alloys normally have poor properties such as slow kinetics, intolerance to surface poisoning and require high temperatures, typically around 300° C.

Energy Conversion Devices, Inc. has investigated and developed Mg-based hydrogen storage alloys for improved storage properties, such as rapid kinetics, high cyclability and tolerance to surface poisoning. Formation of these alloys by a mechanical alloying process has been found to be successful. The mechanical alloying produces a fine multi-phase powdered alloy which can be readily activated under mild conditions, has rapid sorption kinetics and long cycle-life with tolerance to surface poisoning. However these multi-phase alloys still require temperatures of 250–350° C. to desorb all of the stored hydrogen at atmospheric pressure and have strong enthalpies of formation ($\Delta H_f$), typically in the range of about −60 to −75 kJ per mol of $H_2$.

The high temperatures and heat of desorption cannot be provided by most hydrogen-use applications. Even internal combustion engines (ICE), especially when highly optimized, may not be able to provide sufficient heat to desorb the hydrogen at the required rates. Therefore another method of heating the hydrides is needed to successfully use these Mg-based alloys as practical hydrogen storage materials. As noted the $\Delta H_f$ are −60 to −75 kJ/mol $H_2$. The higher and lower heats of combustion for $H_2$ are: 286.6 and 242.3 kJ/mol $H_2$ respectively. Three to four times the amount of heat is released from the combustion of hydrogen than is absorbed by the desorption of hydrogen from the Mg-based hydrides. Therefore it is possible to design a system which uses a portion of the stored hydrogen to provide the necessary heat of desorption. The apparent gravimetric $H_2$ density of the system would be approximately ⅔ the actual $H_2$ density. For instance, an alloy with 6 wt. % $H_2$ density would have an apparent $H_2$ density of about 4 wt. %. The instant invention provides such a system.

SUMMARY OF THE INVENTION

An objective of the present invention is to provide a metal-hydride hydrogen storage system that can be used to store hydrogen in a high-temperature, high-capacity metal-hydride hydrogen storage material.

This objective is satisfied by a self-heating metal-hydride hydrogen storage system comprising: a primary metal-hydride storage container housing a metal-hydride hydrogen storage material, the primary storage container having a hydrogen outlet port; a hydrogen combustor housed within the primary metal-hydride storage container and surrounded by the high-temperature storage material, the combustor having a hydrogen inlet port gaseously connected to the hydrogen outlet port of the primary storage container; and means for supplying hydrogen gaseously connected to the hydrogen inlet port of the combustor.

BRIEF DESCRIPTION OF THE DRAWINGS

FIG. 1 is a highly stylized view of the metal-hydride hydrogen storage system of the present invention.

DETAILED DESCRIPTION OF THE INVENTION

A detailed embodiment of the invention is shown in FIG. 1. As shown in FIG. 1, the high-temperature metal-hydride hydrogen storage system of the present invention comprises a primary metal-hydride hydrogen storage container 5. The metal-hydride hydrogen storage container 5 is preferably made from a thermally nonconductive material. Heat is transferred away from a metal hydride material during the hydrogen absorption process (exothermic) and transferred into the metal hydride material during the hydrogen desorption process (endothermic).

Housed within the primary storage container 5 is a metal-hydride hydrogen storage material 40. Preferably, the metal-hydride hydrogen storage material 40 housed within the primary storage container 5 is a high-temperature metal-hydride hydrogen storage material. As used herein, a high-temperature metal-hydride hydrogen storage material is a metal-hydride hydrogen storage material which will have a 1 atmosphere equilibrium plateau pressure at temperatures at or above 100° C. The high-temperature storage material may be a magnesium-based hydride alloy (also known as an "Mg-based" hydride alloy) such as $MgH_2$. Other examples of Mg-based hydrides that can be used as the high-temperature storage material are discussed in commonly assigned U.S. patent application Ser. No. 08/730,274 now U.S. Pat. No. 5,916,381, the disclosure of which is incorporated by reference herein.

The metal-hydride hydrogen storage material 40 housed within the primary storage container may be physically bonded to a support means. Generally, the support means can take the form of any structure than can hold the hydridable material. Examples of support means include, but are not limited to mesh, grid, matte, foil, foam and plate. Each may exist as either a metal or a non-metal. The support means may be formed from a variety of materials with the appropriate thermodynamic characteristics that can provide the necessary heat transfer mechanism. These include both metals and non-metals. Preferable metals include those from the group consisting of Ni, Al, Cu, Fe and mixtures or alloys thereof. Examples of support means that can be formed from metals include wire mesh, expanded metal and foamed metal.

The metal-hydride hydrogen storage material may be physically bonded to the support means by compaction and sintering processes. The hydridable material is first converted into a fine hydridable power. The hydridable powder is then compacted onto the support means. The compaction process causes the hydridable powder to adhere to and become an integral part of the support means. After compaction, the support means that has been impregnated with hydridable powder is preheated and then sintered. The preheating process liberates excess moisture and discourages oxidation of the hydridable powder. Sintering is carried out in a high temperature, substantially inert atmosphere containing hydrogen. The temperature is sufficiently high to promote particle-to-particle bonding of the hydridable material as well as the bonding of the hydridable material to the support means.

The support means/hydridable material can be packaged within the primary storage container in many different configurations. Examples are provided in commonly assigned U.S. patent application Ser. No. 08/623,497 now U.S. Pat. No. 5,778,972, the disclosure of which is incorporated by reference herein. The hydrogen that is stored in the hydridable metal-hydride storage material may flow out of the primary storage container 5 via the hydrogen outlet port 8. This port permits the flow of hydrogen gas into and out of the primary container 5.

The primary metal-hydride hydrogen storage container of the present invention also comprises at least one hydrogen combustor that is housed within the primary storage container 5. In the embodiment shown in FIG. 1, the primary metal-hydride hydrogen storage container houses a single hydrogen combustor 30. The hydrogen combustor 30 has a hydrogen inlet port 31 which is gaseously connected to the hydrogen outlet port 8 of the storage container 5 via an external manifold 23. The hydrogen combustor 30 is surrounded by the metal-hydride storage material and provides an internal heat source for heating the material. The combustor 30 comprises a nonporous chamber 32. The chamber 32 is made from a "nonporous" material which does not permit the flow of either oxygen, hydrogen or water between the interior of the combustor and the metal-hydride material. Preferably, the chamber 32 is formed from a nonporous, thermally conductive material. Housed within the chamber 32 is a catalyst 34. Generally, the catalyst 34 is one which can lower the activation energy of hydrogen combustion. Preferably, the catalyst 34 comprises Pd. More preferably, the catalyst 34 is Pd which is supported on alumina. Most preferably, the catalyst 34 is a mixture of (1) 50% by volume of 5% Pd supported on gamma-alumina mixed with (2) 50% by volume of gamma-alumina. Also housed within the chamber 32 is a hydrogen distribution tube 35. The hydrogen tube 35 is positioned so that it is surrounded by the catalyst 34. Furthermore, the hydrogen distribution tube 35 is gaseously connected to the hydrogen inlet port 31. Hence, hydrogen gas from the metal-hydride material within the primary storage container 5 is transported into the hydrogen distribution tube 35 via the external manifold 23.

The hydrogen distribution tube 35 is formed from a material which permits the passage of hydrogen gas into the high-temperature storage material. Preferably, the hydrogen distribution tube 35 is formed from a porous metal such as a porous stainless steel. Most preferably, the hydrogen distribution tube is adapted to have alternating areas of high and low porosity, thereby providing for a more uniform distribution of hydrogen gas into the metal-hydride hydrogen storage material. In the one embodiment of the invention, the hydrogen distribution tube 35 is formed from porous stainless steel. This tube is coated with spiral bands of a high-temperature steel-like sealant (i.e., Thermo Seal) thereby forming the desired alternating pattern of high-porous and low-porous areas on the distribution tube. The embodiment of the hydrogen combustor 30 shown in FIG. 1 includes an oxygen inlet port 37 which provides a means of allowing oxygen to enter the combustor 30. More specifically, the oxygen inlet port 37 is positioned so that oxygen can enter the region of the combustor 30 housing the catalyst 34.

The embodiment of the combustor 30 also includes an exhaust outlet port 39. Combustor exhaust collects in the exhaust region 38 of the combustor 30 and exists the exhaust outlet port 39. The exhaust is transported from the combustor and out of the primary metal-hydride container via the exhaust tube 25 which is gaseously connected to the exhaust outlet port 39. In the embodiment shown in FIG. 1, the exhaust tube 25 is a short and straight piece of tubing. However, in another embodiment of the invention, the exhaust tube 25 is adapted so that it is coiled and wound through the metal-hydride material. This permits the heat from the exhaust to transfer into the metal-hydride material in the primary container. Further, in another embodiment of the invention, the exhaust tube is additionally wound around the outside of the primary storage container after exiting said primary storage container.

It is noted that more than one hydrogen combustor may be housed within the interior of the primary metal-hydride storage container. In specific embodiments of the present invention, the primary metal-hydride storage container houses one, two, three, four, and more than four hydrogen combustors.

The metal-hydride hydrogen storage system of the present invention further comprises means for supplying hydrogen which is gaseously connected to the hydrogen inlet port 31 of the hydrogen combustor 30. Generally, the means for supplying hydrogen can be any source of hydrogen that can supply the necessary quantity of hydrogen to the combustor. Typically, the "necessary" quantity of hydrogen is that amount sufficient to heat the metal-hydride storage material of the primary storage container to a temperature enabling hydrogen desorption from said material. Examples of the means for supplying hydrogen include, but are not limited to hydrogen storage as a gas in a high-pressure hydrogen storage tank, hydrogen storage as a liquid in a cryogenic container, and hydrogen storage in a solid in the form of a metal-hydride.

Preferably, the means for supplying hydrogen is a secondary metal-hydride hydrogen storage container 50 which houses a second metal-hydride hydrogen storage material. Preferably, the second metal-hydride storage material housed in the secondary storage container is a "low-temperature" metal hydride hydrogen storage material. As used herein a low-temperature metal-hydride hydrogen storage material is a metal-hydride hydrogen storage material which will have a 1 atmosphere equilibrium plateau pressure at temperatures below 100° C. Examples of compounds that may be used to form low-temperature metal hydrides include, but are not limited to, the alloys from the $AB_5$ (e.g. $LaNi_5$), AB (e.g. TiFe), and $AB_2$ (e.g., $ZrV_2$ and $ZrMn_2$) families. Using these compound, metal hydrides can be formed readily and reversibly (i.e. hydrogenated and dehydrogenated) in the vicinity of ordinary temperatures and at modest hydrogen pressures. The second metal-hydride hydrogen storage material may be physically bonded to the same type of support means described above in reference to the primary metal-hydride storage container.

The secondary storage container is gaseously connected to the hydrogen inlet port 31 of the hydrogen combustor 30. Hence, hydrogen gas can flow from the secondary container 50 and into the combustor 30. Furthermore, as shown in FIG. 1, the secondary storage container 50 is gaseously connected to the hydrogen outlet port 8 of the primary container 5 via the external manifold 23, thereby permitting the flow of hydrogen gas from the primary container 5 to the secondary container 50.

As shown in FIG. 1, hydrogen from the secondary storage container 50 (or from any other embodiment of the means for supplying hydrogen) enters the hydrogen inlet port 31 of the combustor 30. The hydrogen passes through the porous chamber 35 and into the catalyst 34. Compressed air, which includes oxygen, is passed into the catalyst via the oxygen inlet port 37. The Pd catalyst catalyzes the reaction between the hydrogen and the oxygen in the compressed air. The reaction is

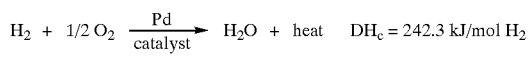

$$H_2 + 1/2\, O_2 \xrightarrow[\text{catalyst}]{\text{Pd}} H_2O + \text{heat} \quad DH_c = 242.3 \text{ kJ/mol } H_2 \quad (1)$$

The heat generated from the hydrogen combustion is initially used to heat the high-temperature metal-hydride storage material in the primary storage module up to a temperature at which the hydride material starts to desorb hydrogen. This temperature is typically greater than or equal to about 250° C. At this point, the heat produced by the hydrogen combustor 30 does two things: (1) it maintains the temperature of the metal-hydride storage material (i.e., compensates for heat transfer out of the material), and (2) provides the heat of desorption of hydrogen from the metal-hydride material. The reaction describing said desorption of hydrogen is $$MH_x + \text{heat}(\Delta H_{desorption}) \rightarrow M + x/2 H_2 \quad (2)$$

For the Mg-based hydride alloys, $\Delta H_{desorption}$ is about 75 kJ/mol $H_2$. Therefore, if the system were ideal, with no heat losses, the desorption rate would be equal to $\Delta H_c/\Delta H_{descrption}$ times the rate of hydrogen to the combustor. For the system described above, the desorption rate would be equal to 242.3 divided by 75=3.2 times the rate of hydrogen to the combustor.

Hence, as hydrogen is desorbed from the hydrogen storage material, is exits the hydrogen outlet port 8 and enters the manifold 23. Most of the hydrogen exists the manifold outlet 27 while a portion is recycled by the manifold 23 to the hydrogen inlet port 31 and into the combustor 30. The recycled hydrogen is used by the combustor to maintain the temperature of the system and provide the heat necessary to the continued desorption of hydrogen.

Comparing the $\Delta H_c$ from equation (1) with the $\Delta H_{desorption}$ from equation (2), shows that about three to four times the amount of heat is released from the combustion of hydrogen than is absorbed by the Mg-based hydrides due to desorption of hydrogen from the hydrides. There only a portion of the stored hydrogen is needed to provide the necessary heat of desorption. The apparent gravimetric $H_2$ density of the system would be approximately two-thirds the actual $H_2$ density. For example, an alloy with 6 wt % $H_2$ density would have an apparent $H_2$ density of about 4 wt %.

It is noted that the self-heating metal-hydride hydrogen storage system of the present invention may further comprise temperature sensors for detecting the temperature of the hydrogen storage materials in both the primary and the secondary storage containers. As well, the storage system of the present invention may further include pressure sensors for detecting the pressure of hydrogen released from the primary and well as the secondary storage containers.

While the invention has been described in connection with preferred embodiments and procedures, it is to be understood that it is not intended to limit the invention to the described embodiments and procedures. On the contrary it is intended to cover all alternatives, modifications and equivalence which may be included within the spirit and scope of the invention as defined by the claims appended hereinafter.

We claim:

1. A self-heating metal-hydride hydrogen storage system comprising:

a primary metal-hydride storage container housing a metal-hydride hydrogen storage material, said primary storage container having a hydrogen outlet port;

a hydrogen combustor housed within said primary metal-hydride storage container and surrounded by said storage material, said combustor having a hydrogen inlet port in gaseous communication with said hydrogen outlet port of said primary storage container; and means for supplying hydrogen in gaseous communication with said hydrogen inlet port of said combustor.

2. The storage system of claim 1, wherein said metal-hydride hydrogen storage material is a high-temperature metal-hydride hydrogen storage material.

3. The storage system of claim 1, wherein said means for supplying hydrogen is a secondary metal-hydride hydrogen storage container housing a second metal-hydride hydrogen storage material.

4. The storage system of claim 3, wherein said second metal-hydride hydrogen storage material of said secondary storage container is a low-temperature metal-hydride hydrogen storage material.

5. The storage system of claim 1, wherein said combustor comprises:

a nonporous chamber having an oxygen inlet port, and an exhaust outlet port;

a catalyst for lowering the activation energy of hydrogen combustion, said catalyst housed within said chamber; and a hydrogen distribution tube housed within said chamber and surrounded by said catalyst, said distribution tube in gaseous communication with said hydrogen inlet port.

6. The storage system of claim 5, wherein said catalyst comprises Pd.

7. The storage system of claim 5, further comprising an exhaust tube in gaseous communication with said exhaust outlet port, said exhaust tube transporting exhaust from said combustor.

8. The storage system of claim 2, wherein said high-temperature metal-hydride hydrogen storage material is a magnesium-based alloy.

* * * * *